United States Patent [19]
Kondo

[11] Patent Number: 5,903,841
[45] Date of Patent: May 11, 1999

[54] SYSTEM AND METHOD FOR SIMPLIFIED HANDOFF OPERATION IN A CELLULAR MOBILE COMMUNICATION SYSTEM

[75] Inventor: Seiji Kondo, Tokyo, Japan

[73] Assignee: NEC Corporation, Tokyo, Japan

[21] Appl. No.: 08/654,290

[22] Filed: May 28, 1996

[30] Foreign Application Priority Data

May 29, 1995 [JP] Japan ................................ 7-130369

[51] Int. Cl.⁶ ............................... H04Q 7/36; H04Q 7/30
[52] U.S. Cl. .......................... 455/436; 455/522; 455/437; 455/442; 455/436; 375/200
[58] Field of Search .................... 455/443, 446, 455/447, 448, 444, 436, 442, 522; 370/320, 335, 342, 331, 18; 375/200, 206, 295

[56] References Cited

U.S. PATENT DOCUMENTS

| | | | |
|---|---|---|---|
| 4,704,734 | 11/1987 | Menich et al. | 455/33 |
| 5,548,616 | 8/1996 | Mucke et al. | 375/295 |
| 5,548,813 | 8/1996 | Charas et al. | 455/33.3 |
| 5,559,790 | 9/1996 | Yano et al. | 370/18 |
| 5,604,766 | 2/1997 | Dohi et al. | 375/200 |
| 5,625,876 | 4/1997 | Gilhousen et al. | 455/33.3 |
| 5,697,057 | 12/1997 | Bursztejn et al. | 455/33.3 |

OTHER PUBLICATIONS

An Overview of the Application of Code Division Multiple Access (CDMA) to Digital Cellular Systems and Personal Cellular Networks; May 21, 1992; Qualcomm Incorporated; pp. i–vi and 1–58.

Primary Examiner—Dwayne D. Bost
Assistant Examiner—Alan Gantt
Attorney, Agent, or Firm—Whitham, Curtis & Whitham

[57] ABSTRACT

The present invention provides a mobile communication cellular system using the CDMA transmission system which is capable of performing the handoff operation without control of a radio base station control apparatus. The first spread code specified for each sector cell is attended with the transmitted signal to a mobile station and the mobile station can receive all first spread codes from all sector cells at the time of call establishment, and the mobile station transmits the second spread code indicating the identification code of the mobile station. At the time of handoff operation, the radio base station selects the sector cell to be switched in accordance with a correlation value calculated based on received signal form the mobile station, and the mobile station selects the communication channel based on the information of the first spread codes having been received.

4 Claims, 3 Drawing Sheets

SYSTEM AND METHOD FOR SIMPLIFIED HANDOFF OPERATION IN A CELLULAR MOBILE COMMUNICATION SYSTEM

BACKGROUND OF THE INVENTION

1. Field of the Invention

The present invention relates to a mobile communication cellular system, and, more particularly, to a technique of handoff control when a mobile station moves from one sector cell to other sector cell, each sector cell is provided by a radio base station using a CDMA (Code Division Multiple Access) transmission system for communication with mobile stations.

2. Description of the Related Art

FIG. 2 is a view showing an example of a structure of a conventional mobile communication cellular system using the CDMA transmission system.

As shown in FIG. 2, the mobile communication cellular system is constituted by a plurality of mobile stations 103-1 to 103-n, a radio base station 102 for transmitting/receiving radio signals with respect to communication with the mobile stations 103-1 to 103-n, and a radio base station control apparatus 101 for controlling the radio base station 102.

Further, a voice encoder 104 for encoding and decoding a voice signal is provided within the radio base station control apparatus 101, and TRXes (transmitter/receiver) 110-1 to 110-N for transmitting/receiving radio signals between the radio base station 102 and the mobile units 103-1 to 103-n are provided within the radio base station 102 in accordance with each of sector cells 1 to N thereof.

The handoff operation, which is carried out when a mobile station moves from one sector cell to other sector cell, in the above-described configuration will be described with referring to FIG. 3 as well as FIG. 2.

FIG. 3 shows a signal flowchart of the handoff operation in the mobile communication cellular system illustrated in FIG. 2.

In the mobile communication cellular system, a pilot indicating a ratio of Eb/I0 (Eb: energy per one bit, I0: interfering energy from another channel) is always transmitted from the radio base station 102 providing a plurality of the sector cells 1 to N to the mobile stations 130-1 to 130-n.

In each of the mobile stations 130-1 to 130-n, each strength of pilot (Eb/I0) transmitted from all sector cells are received, and compares the strength of pilot from the sector cell which is currently performing communication with the strength of pilot from each of adjacent sector cells for detecting a sector cell which is optimum for carrying out the communication, namely, a sector cell providing the strongest pilot is detected.

It is assumed that the mobile station 103-1 is currently communicating with the TRX 110-1 of the sector cell 1.

The strength of pilot from the sector cell 1 is compared with that of the strength of pilot from the sector cell 2 in the mobile station 103-1 and, if the strength of pilot from the sector cell 2 exceeds it from the sector cell 1, the message (Pilot Strength Measurement Massage) for requesting the handoff operation control is transmitted from the mobile station 103-1 to the radio base station 102.

The message sent to the radio base station 102 is further transferred to the radio base station control apparatus 101.

When the message for requesting the handoff operation control is transmitted, the radio base station control apparatus 101 analyzes which sector cell providing pilot whose strength exceeds the strength of pilot of the sector cell 1 with which the mobile station 103-1 is currently communicating. In this case, since the strength of pilot of the sector cell 2 exceeds the pilot of the sector cell 1, it is determined that the mobile station 103-1 is subjected to perform the handoff operation from the sector cell 1 to the sector cell 2.

Then, the radio base station control apparatus 102 transmits the handoff direction message to the mobile station 103-1 through the radio base station 102 for assigning a communication channel which can be used at the sector cell 2. At this time, the message is transferred to the mobile station 103-1 through the communication channel currently being communicating between the sector cell 1 and the mobile station 103-1. Also, at the same time, the communication channel activating message is transferred from the radio base station control apparatus 101 to the sector cell 2 for activating the communication channel of the sector cell 2 having been assigned to the mobile station 103-1 for the handoff operation The communication channel of the sector cell 2 is activated in accordance with parameters set in the communication channel activating message, and a transmission power of radio signal for the communication channel at the sector cell 2 is set to the same transmission power of the sector cell 1 or a maximum transmission power.

When the handoff direction message is received by the mobile station 103-1, the communication operation using a newly assigned communication channel is tried. If the trial operation is succeeded, a handoff completion message is transmitted from the mobile station 103-1 to the TRX 110-2 of the sector cell 2 in the radio base station 102.

Here, if two or more communication channels are assigned in the handoff direction message, it means that the soft handoff operation which is the handoff operation without interruption of communication is instructed. In such a case, communication trials are performed for all assigned communication channels, and in the radio base station 102, the handoff completion messages are received in all communication channels for which the communication trial has been succeeded.

When a handoff completion message is received in the radio base station 102, information, in which a sector cell number which has received the message is added to the handoff completion message, is transmitted to the radio base station control apparatus 101. If two sector cells have received the handoff completion message, the two handoff completion messages each having a different sector cell number are transmitted to the radio base station control apparatus 101.

When the handoff completion message is received in the radio base station control apparatus 101, the switching control to connect a voice encoder 104 to a channel encoder (not shown) of the corresponding sector cell is performed in accordance with the sector cell number which has been added to the handoff completion message. If a plurality of handoff completion messages have been transmitted from two sector cells, the switching control to connect the voice encoder 104 to those channel encoders are performed.

However, in the conventional mobile communication cellular system, the above-mentioned flow control is performed each time whenever the handoff operation is carried out. Thus, in the case where the area of each sector cell is small, a number of times of the handoff operation increases and it causes problems such that it requires more control processing capabilities in the radio base station control apparatus than expected and also, it requires more radio signals for message transfer between radio base stations and mobile stations for the handoff operation than expected.

SUMMARY OF THE INVENTION

The present invention solves such problems, and is intended to provide a mobile communication cellular system which can perform the handoff operation without control processing by a radio base station control apparatus.

To achieve this aim, the present invention provides a mobile communication cellular system, using a Code Division Multiple Access transmission system for communication with mobile stations, constituted by a radio base station control apparatus, having a voice encoder for encoding and decoding a voice signal, for controlling a radio base station, and the radio base station providing a plurality of sector-cellulated areas for communication with mobile stations, the mobile communication cellular system comprises the following elements:

(1) a channel encoder for code spreading a voice coded signal into a first spread code corresponding to each sector-cellulated area for signal transmission, and for synthesizing second spread codes received from each sector-cellulated area and outputting a voice coded signal;

(2) a plularity of signal transmitters each for transmitting a communication signal together with the first spread code to mobile stations in a specified sector-cellulated area;

(3) a plularity of signal receivers each for receiving a communication signal attended with the second spread code indicating an identification code of a mobile station in a specified sector-cellulated area;

(4) a plurarity of correlation value calculating means, each provided for each of sector-cellulated areas, for calculating a correlation value of a signal level received by a corresponding signal receiver, and outputting the calculated correlation value; and (5) a power transmission controller for controlling a power of signal, being transferred from the channel encoder, to be transmitted by each signal transmitter in accordance with information of calculated correlation value output from each of the correlation value calculating means.

A mobile communication cellular system according to the present invention further comprises detection means in the power transmission controller for detecting one of sector-cellulated areas, in which a mobile station currently being communicating exists, by a correlation value calculated by the correlation value calculating means providing the largest value.

A mobile communication cellular system according to the present invention also comprises controlling means in the power transmission controller for outputting a signal power only to a sector-cellulated area detecting a largest correlation value being calculated by the correlation value calculating means.

In the present invention having the above-mentioned arrangement, the first spread code which is attended with the communication signal and specified for each sector-cellulated area and which includes information concerning the communication channel to be used for a call in each sector-cellulated area is transmitted from the radio base station, and the second spread code which is attended with the communication signal being transmitted from mobile stations and the second spread code indicates an identification code of each mobile station. Therefore, in the handoff operation, new communication channel in an appropriate sector-cellulated area can be set by using the first spread code in the mobile station, which has already been reported all first spread codes at the time of call establishment, without additional direction for setting the communication channel. Moreover, since an appropriate sector-cellulated area is detected in the communication operation by calculating the correlation value based on the received signal level from the mobile station by the correlation value calculating means, the sector-cellulated area to which the mobile station has moved can be identified in the radio base station by the second spread code and the correlation value without control of the radio base station control apparatus.

DETAILED DESCRIPTION OF THE PREFERRED EMBODIMENT

Figure 1:
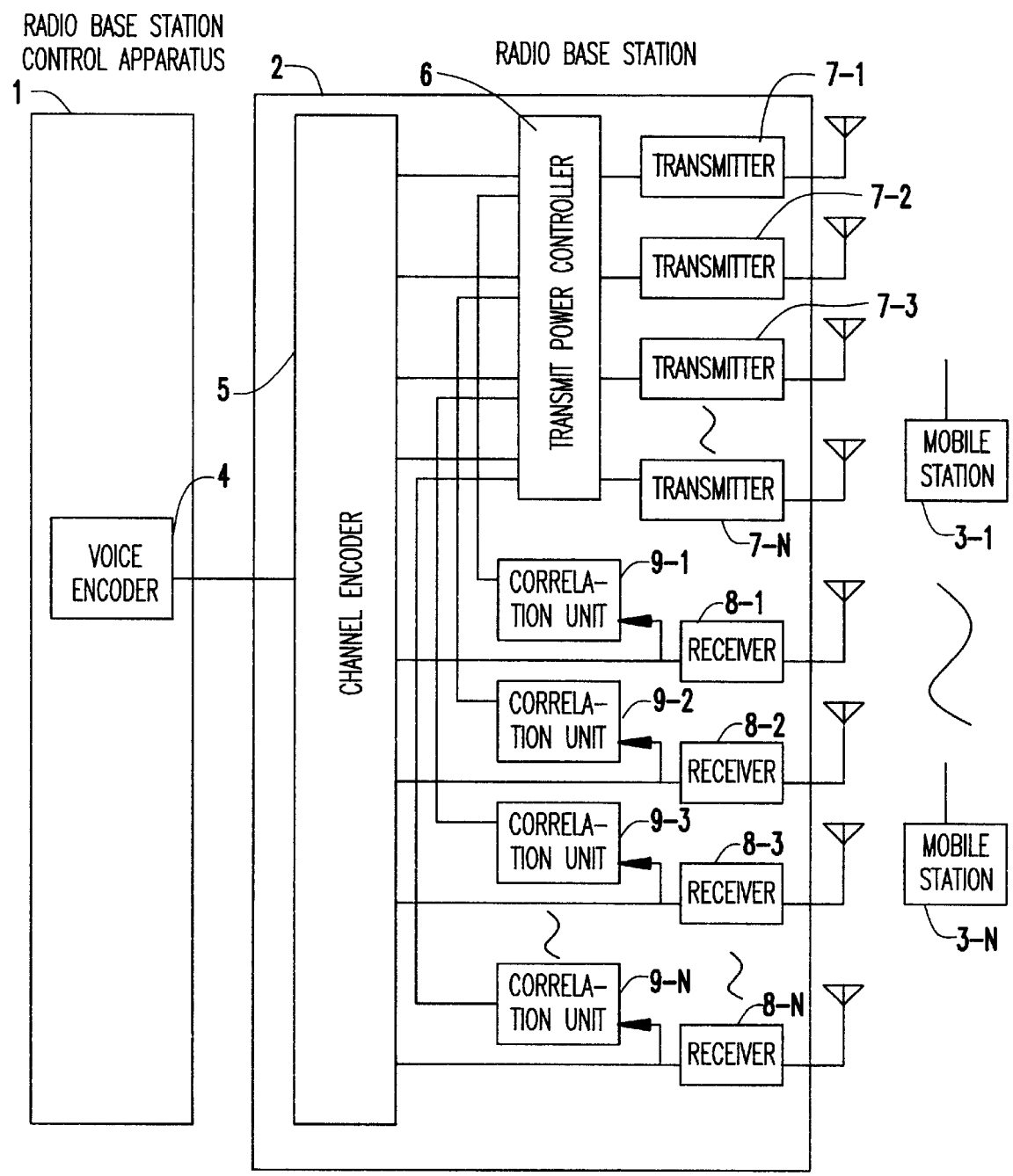
FIG. 1 is a block diagram showing an embodiment of a mobile communication cellular system according to the present invention.
Figure 2:
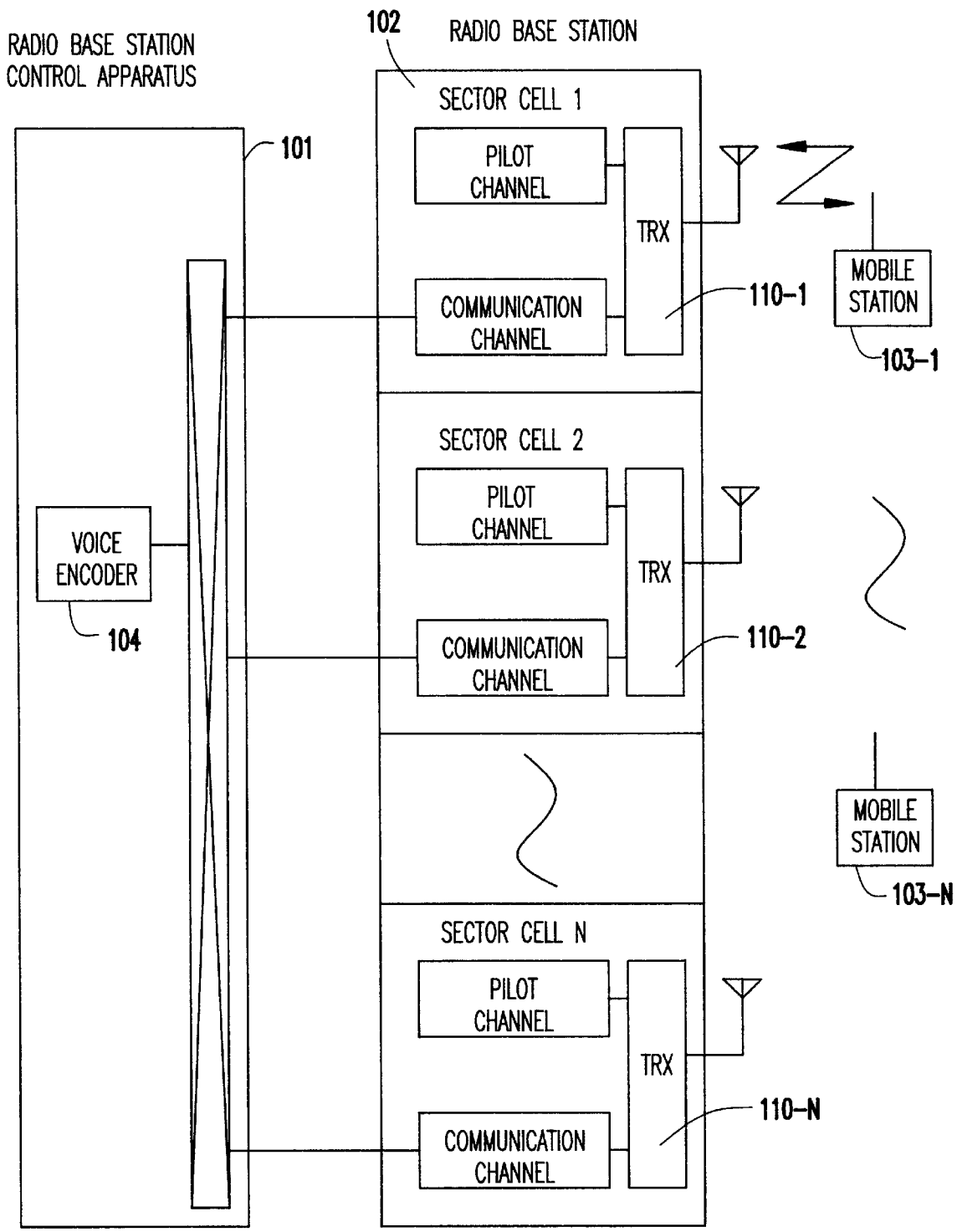
FIG. 2 is a block diagram showing an example of a structure of a prior art mobile communication cellular system.
Figure 3:
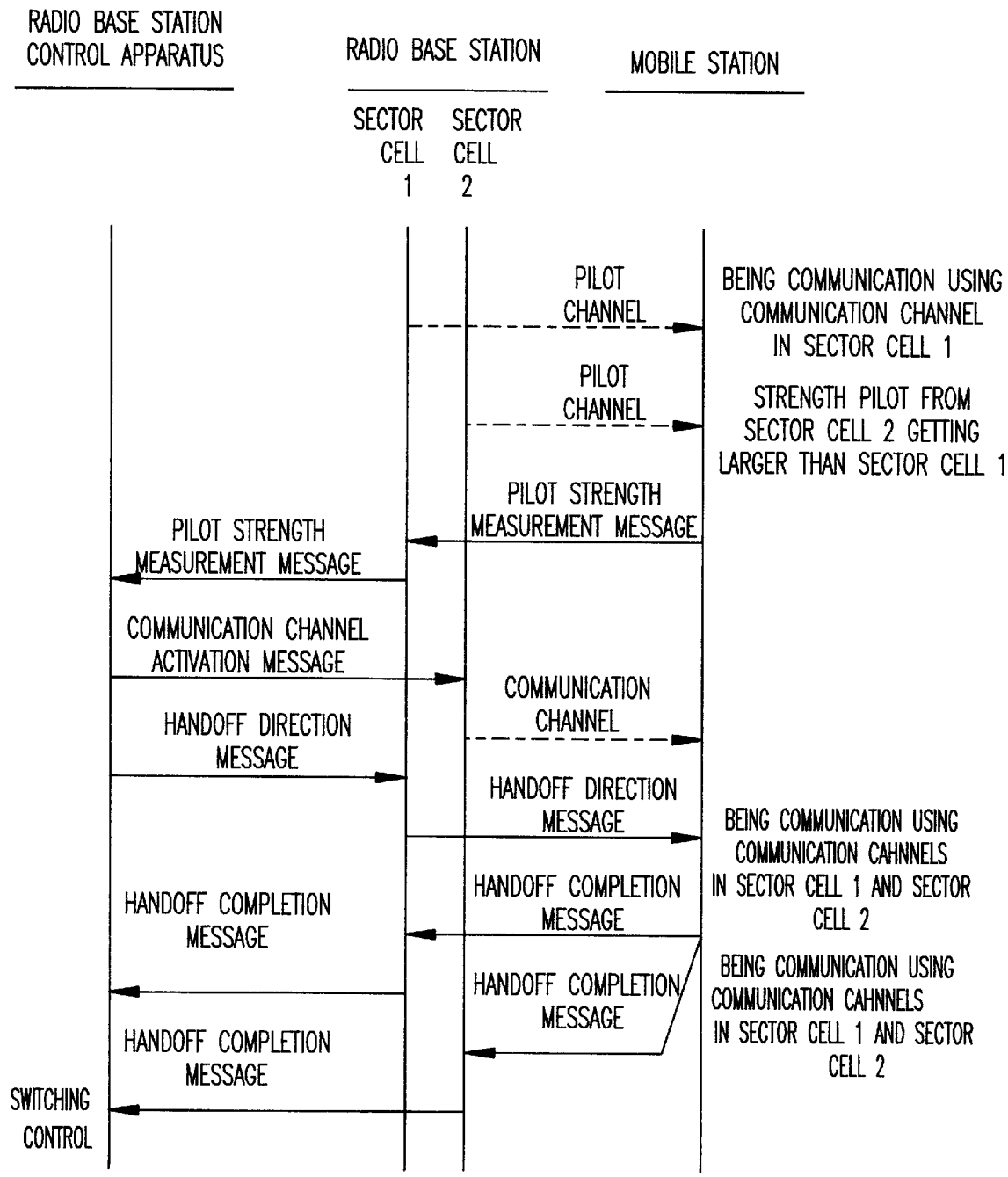
FIG. 3 is a signal flowchart showing a flow control during the handoff in the mobile communication cellular system illustrated in FIG. 2.

The present invention will be described in the following by referring to the attached drawings. FIG. 1 is a block diagram showing an embodiment of a mobile communication cellular system according to the present invention.

As shown in FIG. 1, this embodiment is constituted by a plurality of mobile stations 3-1 to 3-n, a radio base station 2 for transferring radio signals for communication with mobile stations 3-1 to 3-n, and a radio base station control apparatus 1 for controlling the radio base station 2. Further, a voice encoder 4 for encoding and decoding a voice signal is provided in the radio base station control apparatus 1; a channel encoder 5 for synthesizing a voice coded signal for each channel and a transmit power controller 6 for controlling a transmit power output of each voice coded signal divided by the channel encoder 5 are provided in the radio base station 2; and transmitters 7-1 to 7-N for transmitting radio signals to mobile stations 3-1 to 3-n, receivers 8-1 to 8-N for receiving radio signals from mobile stations 3-1 to 3-n and correlation units 9-1 to 9-N which are the correlation calculating means for obtaining a correlation value for each sector cell from the reception level of Eb/I0 received by the receivers 8-1 to 8-N are provided for each of the sector cells 1 to N.

The radio communication operation in the above-mentioned structure will be described hereinbelow.

The voice signal to be transferred a mobile station is first encoded by the voice encoder 4 in the radio base station control apparatus 1 and input to the channel encoder 5 in the radio base station 2.

The voice coded signal, having been input to the channel encoder 5, is spreaded (spread modulation) into the first spread code specified for each sector cell and transmitted to the transmit power controller 6. Here, the first spread code includes channel information used for a call establishment in each sector cell.

In the transmit power controller 6, the transmit power of the transmit data is controlled in accordance with each correlation value calculated in the correlation units 9-1 to 9-N provided in respective sector cells, and the amplitude of the transmit data which is the first signal is varied and transmitted to the transmitters 7-1 to 7-N of the respective sector cells. The correlation value described herein is calculated from the level of the Eb/I0 received by each of the receivers 8-1 to 8-N in the correlation units 9-1 to 9-N.

As a transmit power controlling method in the transmit power controller 6, there can be adopted a method by which only the transmit power of a sector cell having a largest correlation value is transmitted from the transmitter as the maximum transmit power and no power is sent from the transmitters of the remaining sector cells, or a method by which the transmit power is weighted in accordance with a correlation value to control the transmit power.

Thereafter, the transmit data is supplied from the transmitters 7-1 to 7-N to the mobile stations 3-1 to 3-n in accordance with the amplitude determined in the transmit power controller 6. At this time, the first spread code is attended with the transmit data and transmitted to the mobile stations 3-1 to 3-n.

The transmit signal from the mobile stations 3-1 to 3-n, which is the second signal, is received in the receivers 8-1 to 8-N and a demodulated signal is output.

A correlation value is then calculated from a level of the demodulated signal for each sector cell and a reference pattern of the second spread code, which is an identification code of each mobile station, in each of the correlation units 9-1 to 9-N of the respective sector cells. The sector cell in which the mobile station being communicating exists can be assumed from the calculated correlation value. That is because the correlation value calculated by the correlation unit 9-1 of the sector cell 1 is the largest value while correlation values of other sector cells are small if the mobile station being communicating exists in the sector cell 1.

The reference pattern of the second spread code described herein is an identification code of each mobile station, and since it is discriminated in the radio base station, and not necessary to be notified by the radio base station control apparatus, they can be set without the control from the radio base station control apparatus when performing the handoff operation.

The demodulated signals output from the receivers 8-1 to 8-N are input to the channel encoder 5 to be subjected to inverse spreaded, and signals of the respective sector cells are synthesized and decoded in accordance with each symbol of signal. At this stage, since the demodulated signal of a sector cell having no received signal has no energy even if it is subjected to inverse spreaded, it is not affected even when signal for each symbol is synthesized. If the sector cell has even a small quantity of received signal and even a small amount of energy after inverse spreaded, the quality of the signal after synthesis can be improved as compared with that before synthesis.

The voice demodulated signal which has been decoded by the channel encoder 5 is transmitted to the voice encoder 4, and it is converted into a voice signal by the voice encoder 4.

Next, the handoff operation according to the present invention will be described.

It is assumed that a call is being set with respect to the mobile station 3-1 in the sector cell 1.

When setting a call in the sector cell, all the first spread codes which are to be used for a call in sector cells other than the sector cell 1 have also been reported to the mobile station 3-1.

At the same time, the second spread code which is an identification code of the mobile station 3-1 is received by each sector cell and set in the correlation units 9-1 to 9-N of the respective sector cells and the channel encoder 5.

When the mobile station 3-1 has moved toward a direction of the sector cell 2, the correlation value calculated by the correlation unit 9-1 of the sector cell 1 becomes smaller while the correlation value calculated by the correlation unit 9-2 of the sector cell 2 becomes larger.

When the handoff operation is performed, the target sector cell of the handoff is determined by the correlation value being calculated. Therefore, the sector cell to communicate with the mobile station 3-1 is switched in the radio base station 2 from the sector cell 1 to the sector cell 2 which has larger correlation value, and the mobile station 3-1 also switches the first spread code, to be received, corresponding to the sector cell 2 which has been reported at the time of call establishment. At this time, inverse spread is performed by using the first spread codes to synthesize the signals in accordance with respective symbols, as the result, interruption of communication does not occur even if the sector cells are changed over, thus no control by the radio base station control apparatus 1 is required.

In addition, as any other method for controlling the transmit power, there is a method for gradually controlling the transmit power in accordance with the correlation value of each sector cell. In this case, it is unnecessary to carry out inverse spread using the first spread codes previously reported in the mobile station 3-1, the Eb/I0 from other sector cells is periodically measured, and the spread codes are changed over if the measured Eb/I0 exceeds a predetermined threshold value.

As described above, the present invention has the following advantages:

(1) the radio base station control apparatus have nothing to do with the handoff operation;
(2) the transmission power from the radio base station to the mobile station is controlled by the transmit power controlling means so as to stop transmission of power for unused sector cells, and it reduces interferences among the downward signals.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A mobile communication cellular system, using a Code Division Multiple Access transmission system for communication with mobile stations, said system including a radio base station control apparatus, for controlling a radio base station and a voice encoder for encoding and decoding a voice signal, and a radio base station providing a plurality of sectorized cell areas for communication with mobile stations, said mobile communication cellular system further comprising:

a channel encoder for code spreading a voice coded signal into a first spread code corresponding to each sectorized cell area for signal transmission, and for synthesizing second spread codes received from each sectorized cell area and outputting a voice coded signal;

a plurality of signal transmitters each for transmitting a communication signal together with said first spread code to mobile stations in a specified sectorized cell area;

a plurality of signal receivers each for receiving a communication signal attended with said second spread code indicating an identification code of a mobile station in a specified sectorized cell area;

a plurality of correlation value calculating means, each provided for each of sectorized cell areas, for calculating a correlation value of a signal level received from each mobile station by a corresponding signal receiver, and outputting the calculated correlation value; and a power transmission controller for controlling power of a signal transferred from said channel encoder to be transmitted by each signal transmitter in accordance with information of calculated correlation value output from each of said correlation value calculating means, said power transmission controller further including means for comparing correlation values for a mobile station among signals received by said signal receivers and controlling power in accordance therewith, whereby handoff is accomplished independently of said radio base station control apparatus.

2. A mobile communication cellular system as set forth in claim 1, said power transmission controller comprising detection means for detecting one of sectorized cell areas, in which a mobile station currently communicating exists, by a correlation value calculated by said correlation value calculating means providing the largest value.

3. A mobile communication cellular system as set forth in claim 2, said power transmission controller comprising controlling means for outputting a signal power only to a sectorized cell area corresponding to a largest correlation value calculated by said correlation value calculating means.

4. A method of operating a mobile communication cellular system, using a Code Division Multiple Access transmission system for communication with mobile stations, said method comprising steps of:

computing a correlation value of the power received from a mobile station at each of a plurality of receivers corresponding to respective cells in accordance with a spreading code corresponding to said mobile station, comparing said correlation values, and controlling power of a plurality of transmitters corresponding to said respective cells for a signal to be transmitted to said mobile station whereby a handoff of said mobile station can be accomplished independently of a radio base station controller.

* * * * *